William B. Johns & William J. Read's,
Improvement in Harvesters, Rakes &c.

104852  PATENTED JUN 28 1870

Witnesses.  
H. W. Myyatt  
Edmund Masson.

Wm. B. Johns & Wm. J. Read.  
By Attorney A. B. Stoughton.

United States Patent Office.

WILLIAM B. JOHNS, OF GEORGETOWN, DISTRICT OF COLUMBIA, AND WILLIAM J. READ, OF CUMBERLAND, MARYLAND.

Letters Patent No. 104,852, dated June 28, 1870.

IMPROVEMENT IN HARVESTERS.

The Schedule referred to in these Letters Patent and making part of the same.

*To all whom it may concern:*

Be it known that we, WILLIAM B. JOHNS, of Georgetown, in the District of Columbia, and WILLIAM J. READ, of Cumberland, in the State of Maryland, have invented certain new and useful Improvements in Harvesting-Machines and Rakes therefor; and we do hereby declare the following to be a full, clear, and exact description of the construction and operation of the same, reference being had to the accompanying drawings making a part of this specification, in which—

Similar letters of reference, where they occur in the separate figures, denote like parts of the machine in both of the drawings.

Our invention consists—

Figure 1:
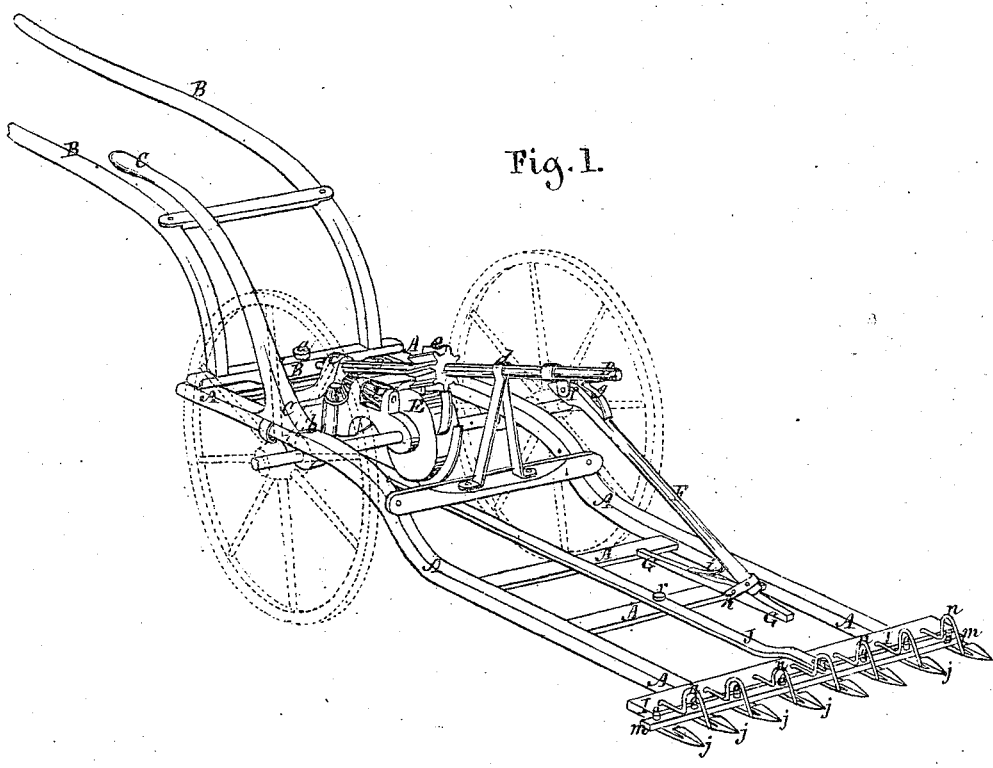
Figure 1 represents, in perspective, so much of the machine as will fully illustrate our invention.
Figure 2:
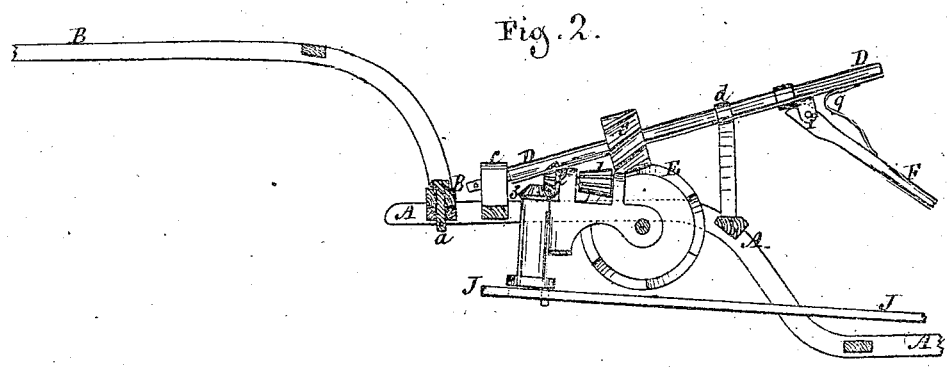
Figure 2 represents a section through the same.

First, in the combination, with a harvesting-machine that is propelled in advance of the team, of a pair of guiding-shafts, pivoted to the main frame, so as to move laterally and vertically, both independent of said main frame, and a lever, attached to said main frame, and extending to the operator, who rides upon the team, so that he may guide said main frame, both laterally and vertically, and independent of the shafts; and Finally, our invention consists in pivoted and vibrating gathering-fingers, which catch and move and hold the stalks to the cutting mechanism while they are severed from the stubble, and serving the purpose of a reel.

To enable others skilled in the art to make and use our invention, we will proceed to describe the same with reference to the drawings.

A is the main frame, which is made drooping from rear to front, as shown in the drawings.

To the rear of and in line with the main frame A there is pivoted a pair of shafts, B, in which the horse that propels the machine is hitched, with his head in the direction of the main frame.

The pivotal connection, *a*, between the shafts and main frame, is such that either may move up or down, or to the right or left, without imparting that movement to the other, or so that the irregularities of the ground over which the horse is passing shall not be communicated to the main frame, and especially the cutters, or those of the main frame to the shafts.

But, while these motions are left free, so that the machine may accommodate itself to the irregularities of the ground, there must be some means for the operator to control the machine.

For this purpose a lever, C, connected to the main frame, is provided, fast at the point *b*, and extending back, so that the operator, who rides on the horse, may seize and work it to raise or lower, or guide to the right or left, the machine, when such an emergency shall arise.

The rake-shaft D is supported in bearings at *c d*, and is revolved by means of a worm-gear, E, on the main axle, which works in a skew-pinion, *e*, on the rake-shaft, and so revolves it.

The rake-shaft rises from its rear toward its front end, and at the front end is pivoted (as at *f*) a rake-stale, F, but controlled by a spring, *g*.

This rake-stale projects downward, and has, pivoted to its lower end, (as at *h*,) a rake-head, G, which may be furnished with rake-teeth, said rake-head being also controlled by a spring, *i*, so as to preserve it in the proper position to sweep off the gavel.

The finger-bar I is attached to the front of the main frame, and in it is set, so as to pivot or turn on their shanks, a series of bent fingers, *n*, the forward ends of which reciprocate, one between each pair of adjacent guards *j*.

In the cutter-bar, *m*, which vibrates in the usual way through the guards *j*, are placed studs, *o o o*, which, as they strike against the gathering-fingers, *n*, move them in one direction, to force and hold the grain between them and the guards while it is being severed by the cutters; the return motion of the cutter-bar reciprocates the fingers *n* in the opposite direction, where they perform a similar duty in connection with the other guards *j* on that side of them.

These fingers *n* do the duty of a reel, as to drawing the grain into the cutters, and, being much lighter, do not bear down the front of the machine so hard upon the ground.

The cutter-bar *m* is reciprocated by the bar J, which is pivoted at *r*, and which is vibrated through the bevel-pinions 1 2 3, the former (1) being driven by a bevel-gear on the main axle, not shown.

We have described but one rake-stale and rake as attached to the rake-shaft. There may be two or more, if found necessary.

What we claim as our invention, is—

In combination with the main frame of a harvesting-machine, and the shafts in rear of it, to which the team is hitched for propelling the machine, the swivel joint at *a*, and the guiding and controlling-lever C, by which the machine may be allowed to conform to the inequalities of the ground, but still be under the control of the operator, substantially as described.

Also, in combination with the guards *j*, and the cutting apparatus *m*, the pivoted gathering-fingers *n*, and the studs *o o*, for reciprocating them, substantially as described and represented.

WM. B. JOHNS.
WILLIAM J. READ.

Witnesses to JOHNS:
 A. B. STOUGHTON,
 EDMUND MASSON.
Witnesses to READ:
 A. SPIER,
 J. B. WINSLOW.